US012104569B2

(12) United States Patent
Usami et al.

(10) Patent No.: US 12,104,569 B2
(45) Date of Patent: Oct. 1, 2024

(54) HYDRAULIC PUMP MOTOR

(71) Applicant: Komatsu Ltd., Tokyo (JP)

(72) Inventors: Hideaki Usami, Tokyo (JP); Naohiro Okubo, Tokyo (JP)

(73) Assignee: Komatsu Ltd., Tokyo (JP)

( * ) Notice: Subject to any disclaimer, the term of this patent is extended or adjusted under 35 U.S.C. 154(b) by 321 days.

(21) Appl. No.: 17/631,987

(22) PCT Filed: Sep. 17, 2020

(86) PCT No.: PCT/JP2020/035340
§ 371 (c)(1),
(2) Date: Feb. 1, 2022

(87) PCT Pub. No.: WO2021/065553
PCT Pub. Date: Apr. 8, 2021

(65) Prior Publication Data

US 2022/0275792 A1 Sep. 1, 2022

(30) Foreign Application Priority Data

Oct. 3, 2019 (JP) ................................ 2019-183176

(51) Int. Cl.

| | |
|---|---|
| ***F03C 1/34*** | (2006.01) |
| ***F03C 1/32*** | (2006.01) |
| ***F04B 1/2035*** | (2020.01) |
| ***F04B 1/2042*** | (2020.01) |
| ***F04B 11/00*** | (2006.01) |

(52) U.S. Cl.
CPC .......... *F03C 1/0652* (2013.01); *F03C 1/0655* (2013.01); *F04B 1/2035* (2013.01); *F04B 1/2042* (2013.01); *F04B 11/00* (2013.01)

(58) Field of Classification Search
CPC .... F03C 1/0652; F03C 1/0655; F04B 1/2035; F04B 1/2042; F04B 11/00
See application file for complete search history.

(56) References Cited

U.S. PATENT DOCUMENTS 7,585,158 B2 9/2009 Zeiser
8,734,127 B2 5/2014 Iida
(Continued)

FOREIGN PATENT DOCUMENTS

CN 101802401 A 8/2010
CN 102812244 A 12/2012
(Continued)

*Primary Examiner* — Charles G Freay
(74) *Attorney, Agent, or Firm* — Locke Lord LLP

(57) ABSTRACT

A hydraulic pump motor includes: a cylinder block; a plurality of cylinder bores; a port block and a valve plate, the valve plate being provided with a high pressure port and a low pressure port, the port block being provided with a discharge oil passage and a suction oil passage, a piston disposed in each cylinder bore, and oil flowing through the discharge oil passage and the suction oil passage. Further, the valve plate is provided with a reproduction port at a bottom dead center side position, the port block is internally provided with a reproduction oil passage, and the reproduction oil passage passes through a first region on a side of the high pressure port of the virtual plane and passes through a second region on a side of the low pressure port of the virtual plane in the port block.

4 Claims, 13 Drawing Sheets

(56) References Cited

U.S. PATENT DOCUMENTS

| | | | |
|---|---|---|---|
| 8,794,124 | B2 | 8/2014 | Iida et al. |
| 9,097,113 | B2 | 8/2015 | Miyata et al. |
| 10,598,146 | B2 | 3/2020 | Iida et al. |
| 2010/0236398 | A1 | 9/2010 | Iida |
| 2013/0068091 | A1 | 3/2013 | Miyata et al. |
| 2013/0152777 | A1 | 6/2013 | Iida et al. |
| 2017/0045028 | A1 | 2/2017 | Iida et al. |

FOREIGN PATENT DOCUMENTS

| | | | | |
|---|---|---|---|---|
| CN | 102985691 | A | | 3/2013 |
| CN | 106460807 | A | | 2/2017 |
| DE | 4229544 | | * | 3/1993 |
| EP | 1519006 | A1 | * | 9/2004 |
| JP | S47-33083 | B | | 8/1972 |
| JP | 2011-236847 | A | | 11/2011 |
| KR | 10-194761 | | * | 1/2019 |
| KR | 10-1943761 | | * | 1/2019 |
| WO | 2009/037994 | A1 | | 3/2009 |

* cited by examiner

HYDRAULIC PUMP MOTOR

FIELD

The present disclosure relates to a hydraulic pump motor.

BACKGROUND

In a hydraulic pump motor of axial type, when a cylinder bore after finishing a suction process communicates with a discharge side high pressure port of a valve plate, oil of the high pressure port sometimes flows into the cylinder bore, and pressure pulsation occurs due to sudden pressure fluctuation. This may generate vibration and noise. For this reason, in this type of hydraulic pump motor, a reproduction oil passage is provided so that the cylinder bore and the high pressure port communicate with each other before the cylinder bore communicates with the high pressure port. According to the hydraulic pump motor, the pressure of the cylinder bore increases to be equal to that of the high pressure port before the cylinder bore communicates with the high pressure port, so that oil of the high pressure port does not flow into the cylinder bore when the cylinder bore communicates with the high pressure port. As a result, the above-described problem can be prevented (e.g., see Patent Literature 1).

CITATION LIST

Patent Literature

Patent Literature 1: U.S. Pat. No. 7,585,158

SUMMARY

Technical Problem

Incidentally, the above-described reproduction oil passage needs to secure a path length of approximately ¼ to ½ of a wavelength determined by the rotational frequency of a hydraulic pump motor. For example, a middle-sized pump having a discharge amount of approximately 95 to 240 cc/rev mounted in a middle-sized construction machine needs a reproduction oil passage having a path length of at least approximately 800 mm when the middle-sized pump has a normal rotation speed of 2,000 rpm and nine cylinder bores. Furthermore, a hydraulic pump larger than a middle-sized pump needs a reproduction oil passage having a longer path length since the hydraulic pump has a low normal rotation speed and a long wavelength determined by the rotational frequency.

The reproduction oil passage can be attached to the outside of a hydraulic pump motor by a hose or a tube. When a reproduction oil passage is provided by a hose or a tube, however, not only the number of components increases, but a place for accommodating a long hose and tube is required, which is disadvantageous in terms of installation space. In contrast, the reproduction oil passage can be provided in a port block and a case which constitute the hydraulic pump motor. When a long reproduction oil passage is simply provided in the port block and the like, however, the external dimension is inevitably increased.

In view of the above-described circumstances, an object of the present disclosure is to provide a hydraulic pump motor capable of preventing occurrence of pressure pulsation while inhibiting an increase in size.

Solution to Problem

To attain the object, a hydraulic pump motor according to the present disclosure includes: a cylinder block provided with a plurality of cylinder bores around a rotation axis; and a port block with which an end surface of the cylinder block is rotatably slide contact via a valve plate, the valve plate being provided with a high pressure port on one side of a virtual plane including the rotation axis and provided with a low pressure port on another side of the virtual plane on a circumference centered on a rotation axis of the cylinder block, the port block being provided with a discharge oil passage that communicates with the high pressure port and a suction oil passage that communicates with the low pressure port, and a piston disposed in each cylinder bore reciprocating with rotation of the cylinder block, oil flowing through the discharge oil passage and the suction oil passage. Further, the valve plate is provided with a reproduction port at a bottom dead center side position that communicates with the cylinder bore between the low pressure port and the high pressure port, the port block is internally provided with a reproduction oil passage that communicates between the reproduction port and the discharge oil passage, and the reproduction oil passage passes through a first region on a side of the high pressure port of the virtual plane and passes through a second region on a side of the low pressure port of the virtual plane in the port block from the discharge oil passage to the reproduction port.

Advantageous Effects of Invention

According to the present disclosure, a reproduction oil passage that communicates between a discharge oil passage and a reproduction port is provided from a region on the side of a high pressure port provided in a port block via a region on the side of a low pressure port. A long reproduction oil passage can be secured while inhibiting an increase in the external dimension, and the occurrence of pressure pulsation can be prevented.

DESCRIPTION OF EMBODIMENTS

A preferred embodiment of a hydraulic pump motor according to the present disclosure will be described in detail below with reference to the accompanying drawings.

Figure 1:
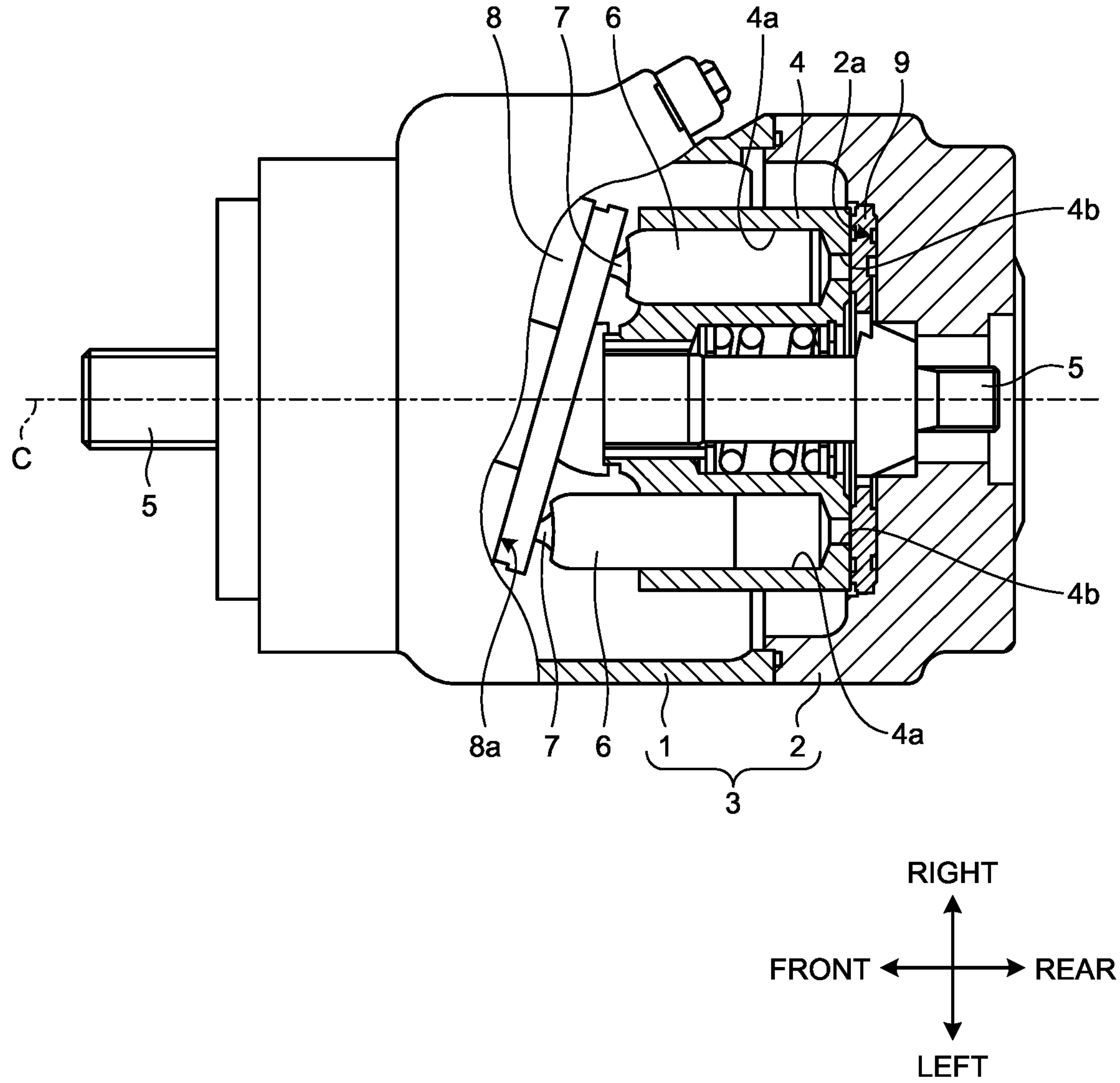
FIG. 1 is an appearance partially cutaway view illustrating the structure of a hydraulic pump motor according to an embodiment of the present disclosure. (omitted)

FIG. 1 illustrates a hydraulic pump motor according to an embodiment of the present disclosure. The hydraulic pump motor illustrated here is an axial-type hydraulic pump motor that operates as a hydraulic pump at the time when power is externally applied to an input/output shaft, and includes a cylinder block 4 inside a pump body 3. The pump body 3 includes a case 1 and a port block 2. The cylinder block 4 is rotatably disposed in the pump body 3 via an input/output shaft 5. The input/output shaft 5 penetrates a center portion. The cylinder block 4 and the input/output shaft 5 are connected by a spline in a state where relative rotation is impossible. That is, the cylinder block 4 is rotatably disposed inside the pump body 3 with a shaft center C of the input/output shaft 5 as a rotation axis.

The cylinder block 4 is provided with a plurality of cylinder bores 4*a* around the input/output shaft 5. The cylinder bores 4*a* are cylindrical cavities formed so as to be parallel to the shaft center C of the input/output shaft 5, and are arranged at equal intervals along the circumferential direction. In the present embodiment, nine cylinder bores 4*a* are provided in the cylinder block 4. Each of the cylinder bores 4*a* has one end opened to one end surface of the cylinder block 4, and the other end opened to the other end surface of the cylinder block 4 via a small-diameter cylinder port 4*b*. A piston 6 is disposed in each of the cylinder bores 4*a*. The piston 6 is movably fitted in a cylinder bore 4*a*, and includes a piston shoe 7 at the end where the piston 6 protrudes from one end surface of the cylinder block 4. Although not illustrated in the figure, the piston shoe 7 is disposed so as to be tiltable to the piston 6. One end of the cylinder block 4 slidably abuts on a swash plate 8 via the piston shoe 7, and the other end thereof slidably abuts on a front surface 2*a* of the port block 2 via a valve plate 9.

The swash plate 8 has an inclined surface 8*a* inclined with respect to the input/output shaft 5, and abuts on the piston shoe 7 via the inclined surface 8*a*. The piston 6 abuts on the inclined surface 8*a* of the swash plate 8 via the piston shoe 7. The piston 6 reciprocates inside the cylinder bore 4*a* in accordance with the inclination of the inclined surface 8*a* when the cylinder block 4 rotates.

Figure 2:
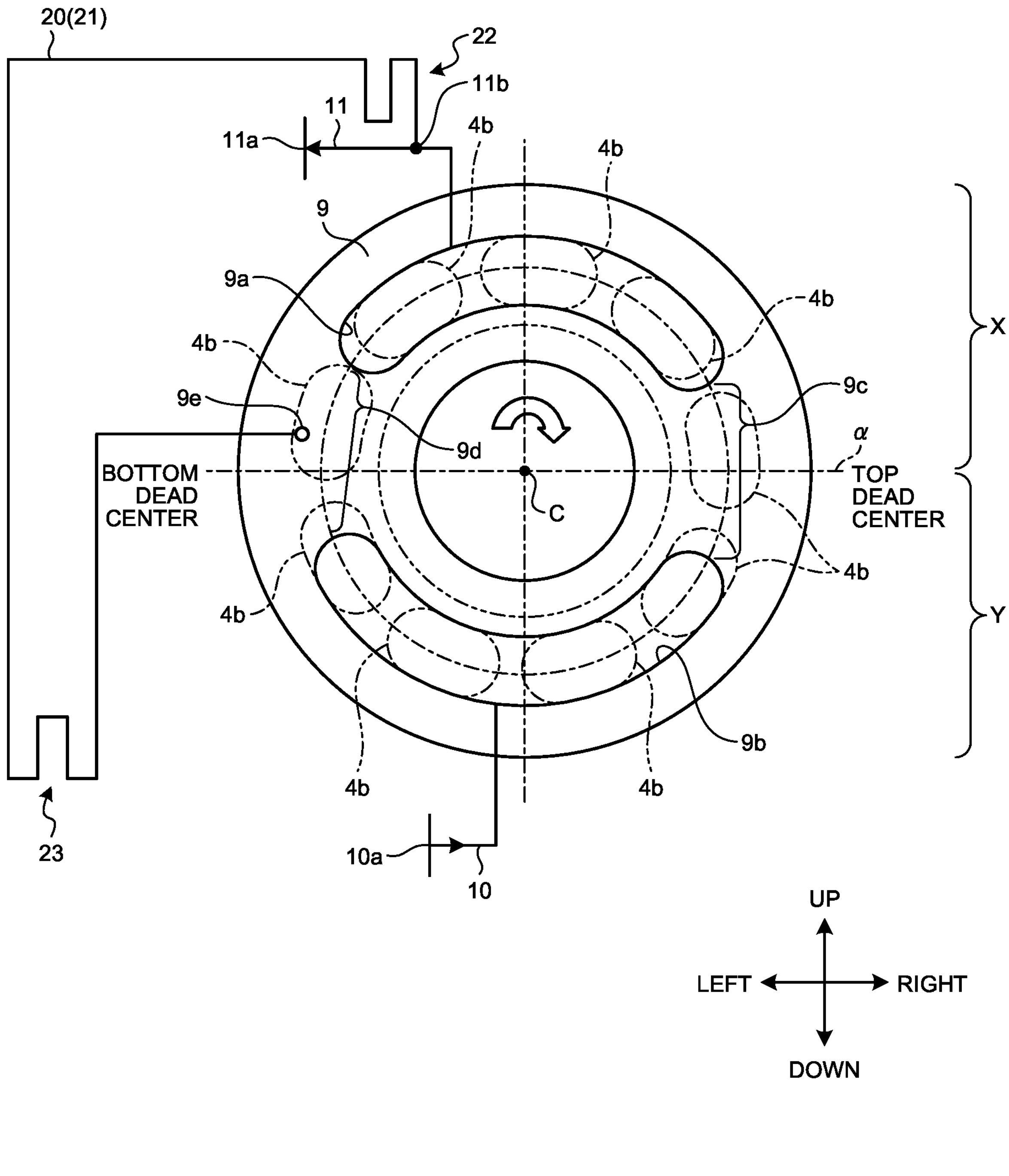
FIG. 2 is a conceptual view illustrating the positional relation between a valve plate and a cylinder port of the hydraulic pump motor in FIG. 1.

The valve plate 9 has a circular shape having an outer diameter larger than that of the cylinder block 4. As illustrated in FIG. 2, the valve plate 9 includes a high pressure port 9*a* and a low pressure port 9*b* on a circumference centered on the shaft center C of the input/output shaft 5. The high pressure port 9*a* is provided one side of a virtual plane $\alpha$ including the shaft center C of the input/output shaft 5. The low pressure port 9*b* is provided on the other side of the virtual plane $\alpha$. In the present embodiment, for convenience, the input/output shaft 5 and the virtual plane $\alpha$ extend substantially horizontally. The swash plate 8 is provided such that the cylinder block 4 rotates clockwise when viewed from the front surface 2*a* (FIG. 1) and the right side serves as a top dead center when viewed from the front surface 2*a*. Therefore, in the illustrated example, the high pressure port 9*a* is provided on the upper side of the virtual plane $\alpha$, and the low pressure port 9*b* is provided on the lower side thereof. Furthermore, FIG. 1 illustrates a cross section taken perpendicularly to the virtual plane $\alpha$.

As is clear from the figure, the high pressure port 9*a* and the low pressure port 9*b* are cutouts penetrating the valve plate 9, and extend in an arc shape so that the plurality of cylinder ports 4*b* can communicate with each other. A top dead center side space 9*c* and a bottom dead center side space 9*d* are secured between the high pressure port 9*a* and the low pressure port 9*b* so that one cylinder port 4*b* is blocked from both the high pressure port 9*a* and the low pressure port 9*b*. Furthermore, in the valve plate 9, a reproduction port 9*e* is provided in the bottom dead center side space 9*d*. The reproduction port 9*e* is a small-diameter opening provided so as to communicate with the cylinder bore 4*a* (FIG. 1) at a position before the cylinder port 4*b* of the cylinder bore 4*a*, which moves with the rotation of the cylinder block 4, finishes communicating with the low pressure port 9*b* and starts communicating with the high pressure port 9*a*. The reproduction port 9*e* is provided so as to penetrate the valve plate 9.

Figure 3:
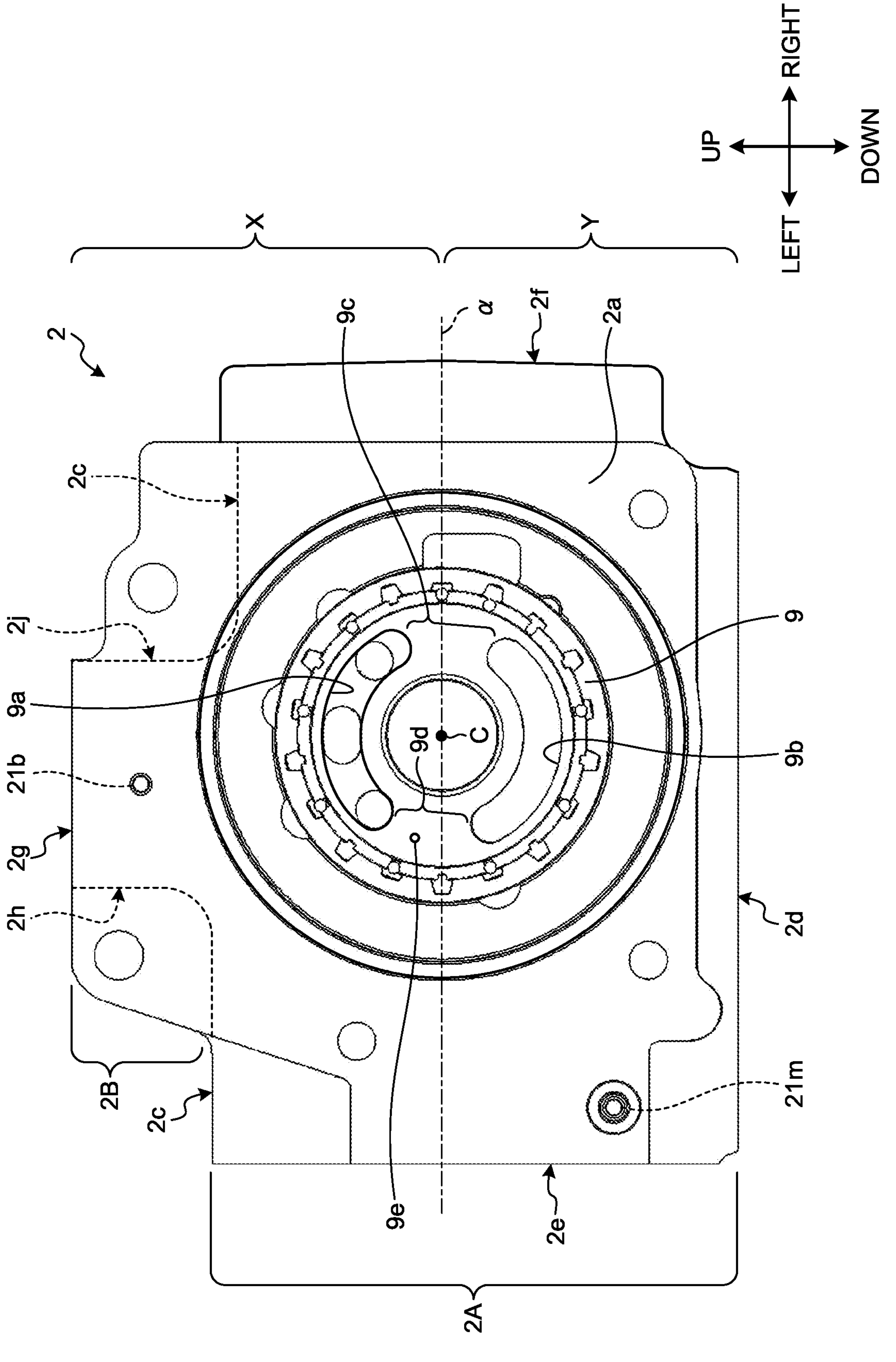
FIG. 3 illustrates a port block and the valve plate applied to the hydraulic pump motor in FIG. 1 as viewed from a front surface side.
Figure 4:
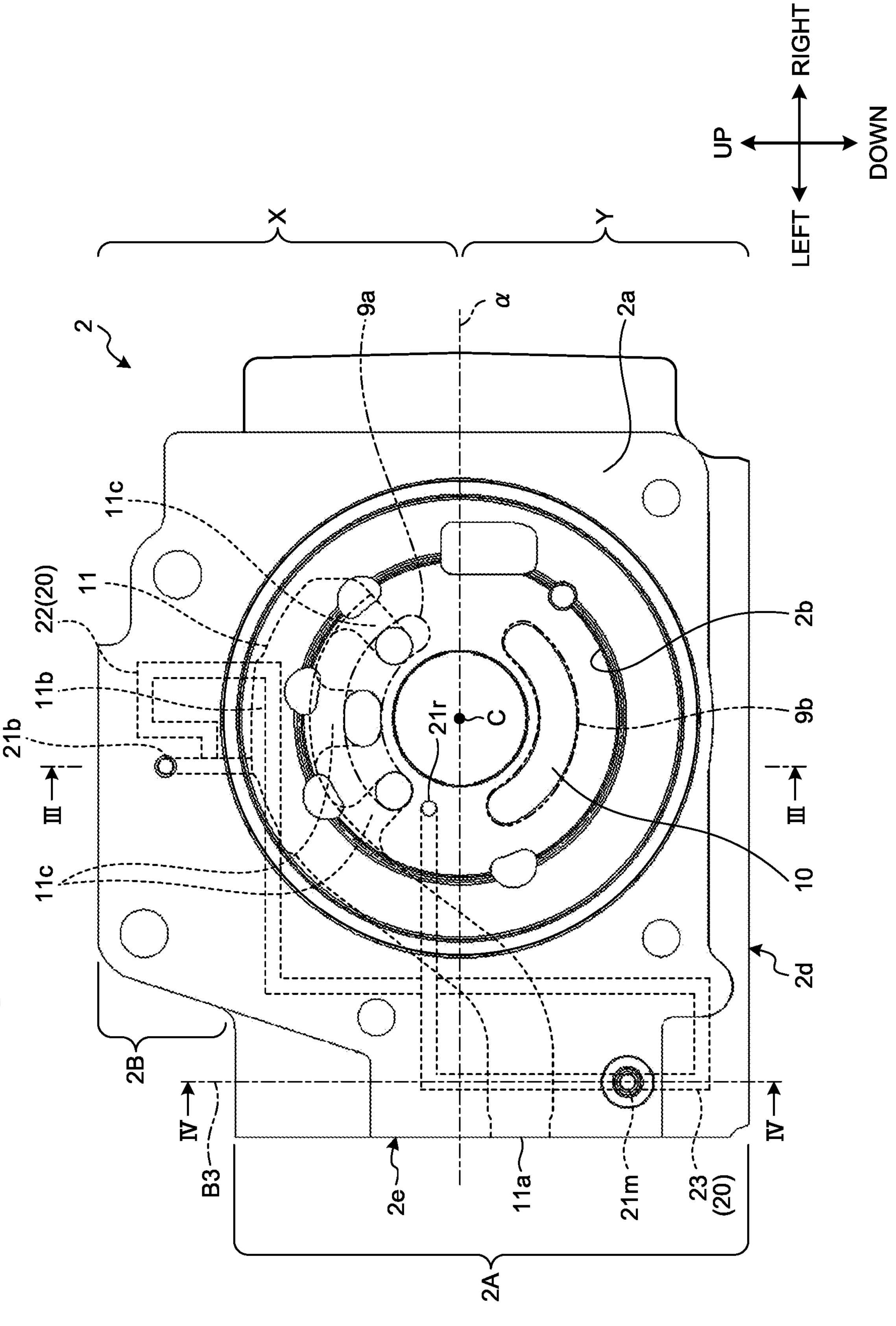
FIG. 4 illustrates the port block applied to the hydraulic pump motor in FIG. 1 as viewed from the front surface side.

As illustrated in FIGS. 3 to 7, the port block 2 is formed by integrally molding a main block portion 2A and a sub-block portion 2B. The main block portion 2A has a large right to left width. The sub-block portion 2B has a small right to left width, and protrudes upward from the upper portion of the main block portion 2A. As illustrated in FIGS. 3 and 4, the above-described valve plate 9 is fixed to a valve plate attachment portion 2*b* provided on the front surface 2*a* of the main block portion 2A. The front surfaces 2*a* of the main block portion 2A and the sub-block portion 2B are located on the same plane. Adjacent surfaces among an upper surface 2*c*, a lower surface 2*d*, and left and right side surfaces 2*e* and 2*f* of the main block portion 2A and an upper surface 2*g* and left and right side surfaces 2*h* and 2*j* of the sub-block portion 2B are substantially orthogonal to each other, and each of these surfaces is substantially orthogonal to the front surface 2*a*.

Figure 8:
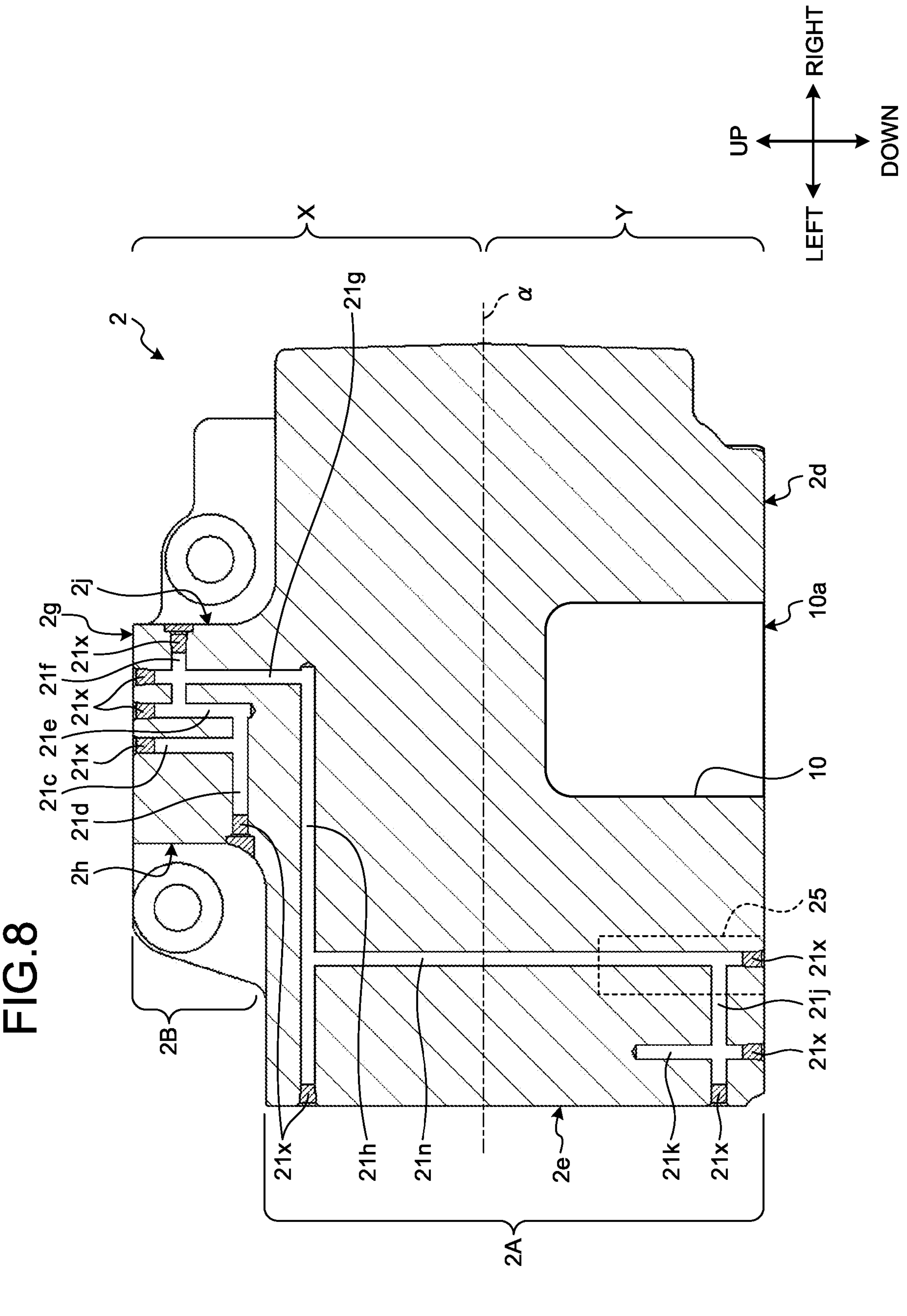
FIG. 8 is a cross-sectional view taken along line I-I in FIG. 5.
Figure 12:
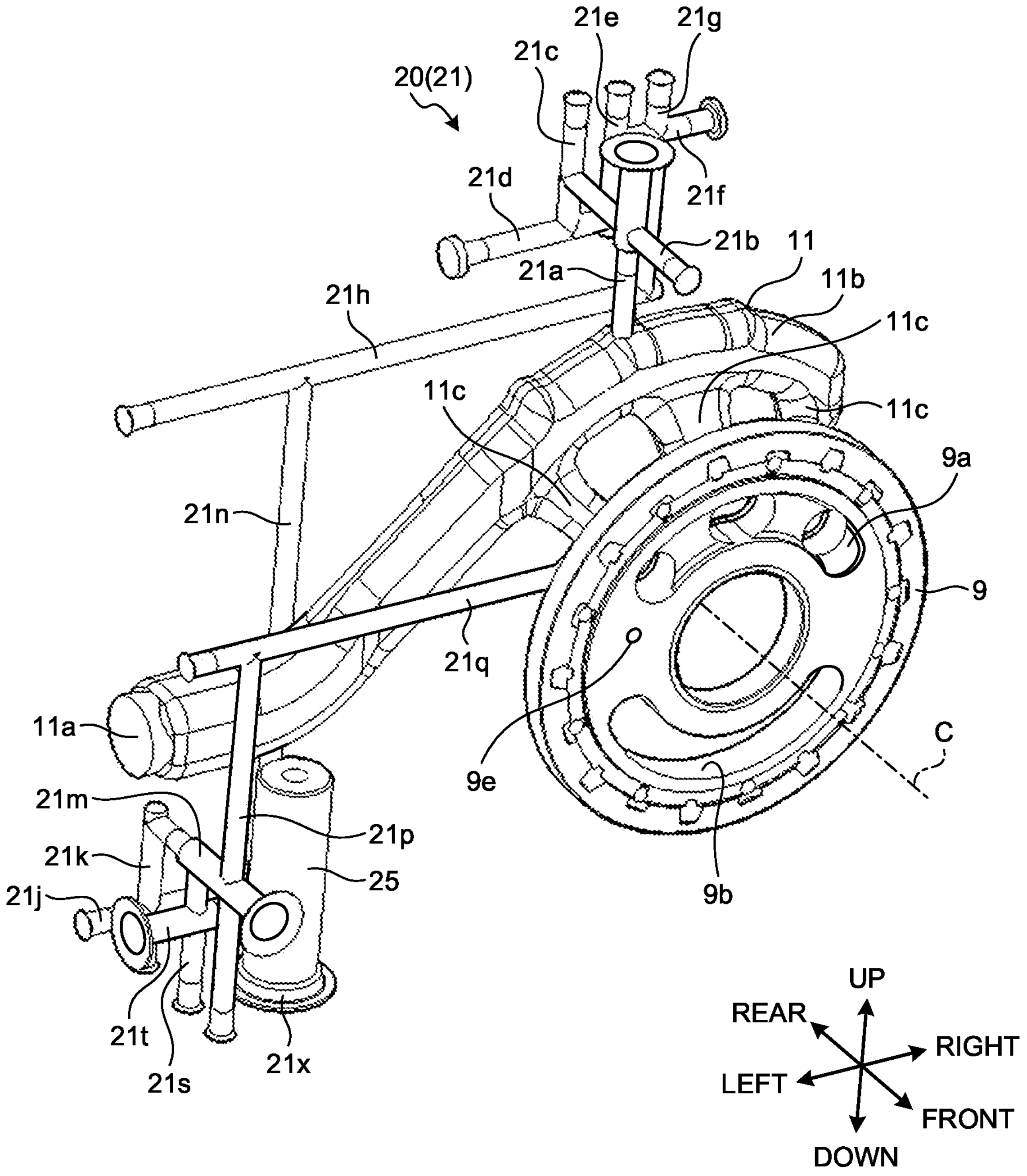
FIG. 12 is a perspective view conceptually illustrating a discharge oil passage and a reproduction oil passage of the hydraulic pump motor in FIG. 1.

As illustrated in FIG. 4, a suction oil passage 10 and a discharge oil passage 11 are provided inside the port block 2. As illustrated in FIGS. 3, 4, and 8, the suction oil passage 10 communicates between the low pressure port 9*b* of the valve plate 9 and a suction port 10*a* (FIG. 8) provided in the main block portion 2A. The suction port 10*a* opens at a lower surface (second side surface) 2*d* located around the shaft center C on an outer surface of the main block portion 2A. As illustrated in FIGS. 4 and 12, the discharge oil passage 11 communicates between the high pressure port 9*a* of the valve plate 9 and a discharge port 11*a* provided in the main block portion 2A. The discharge oil passage 11 includes a main oil passage portion 11*b* and three communication oil passage portions 11*c*. The discharge port 11*a* opens at a left side surface (first side surface) 2*e*, which is located around the shaft center C on the outer surface of the main block portion 2A and adjacent to the lower surface 2*d*. The main oil passage portion 11*b* extends rightward from the discharge port 11*a* toward the shaft center C of the input/output shaft 5 (FIG. 1), extends obliquely upward to the right, and further extends in a curved shape along the outer peripheral surface of the valve plate 9. The extending end of the main oil passage portion 11*b* is closed inside the main block portion 2A. The communication oil passage portions 11*c* extend from the main oil passage portion 11*b* toward the high pressure port 9*a* of the valve plate 9. The suction oil passage 10 and the discharge oil passage 11 are simultaneously formed by providing a core at the time of molding the port block 2 by casting, for example.

Figure 13:
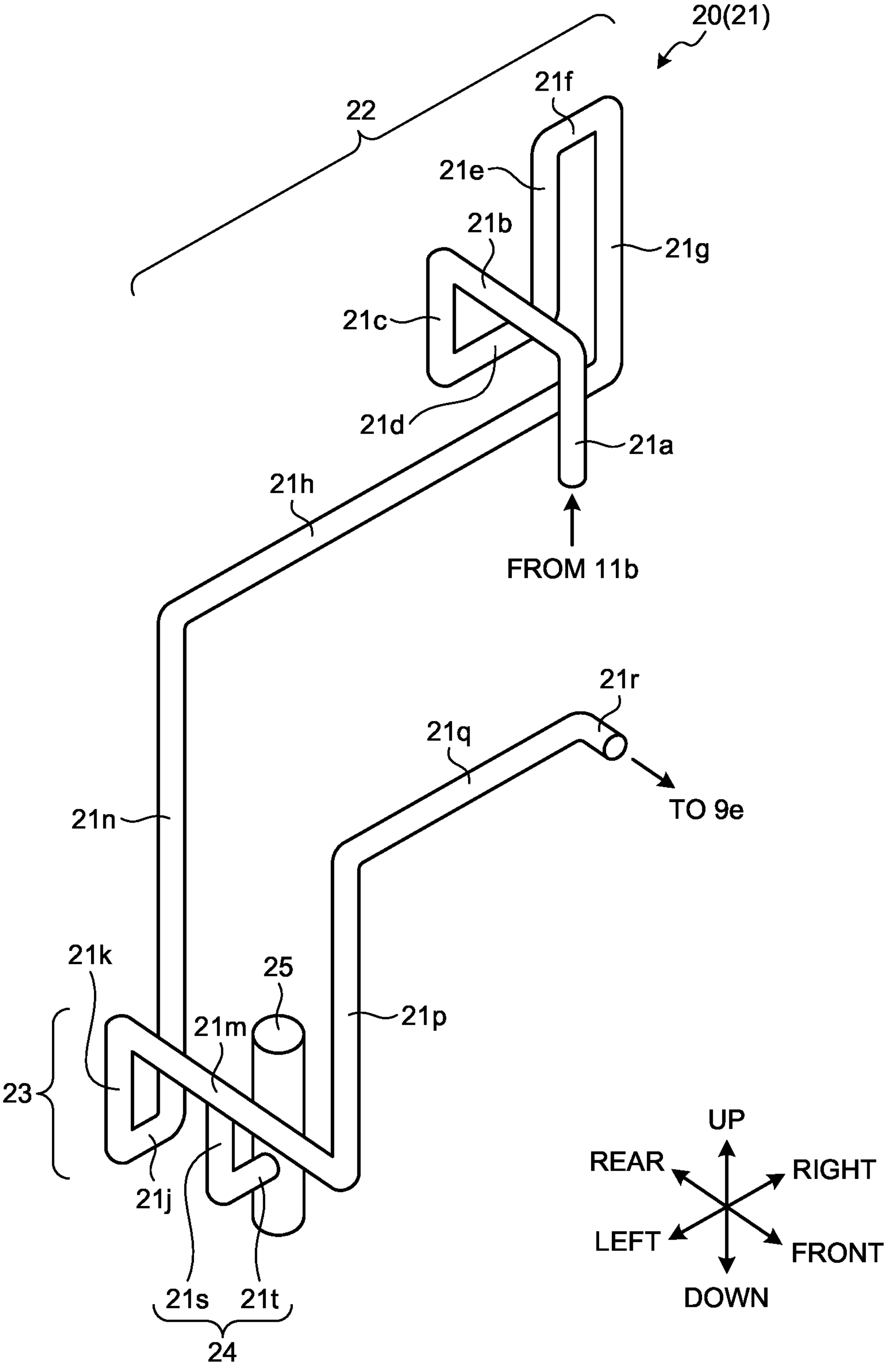
FIG. 13 is a perspective view illustrating the reproduction oil passage in FIG. 12 in a simplified manner.

Furthermore, as illustrated in FIGS. 2, 12, and 13, a reproduction oil passage 20 is provided inside the port block 2 so as to communicate between the main oil passage portion 11*b* of the discharge oil passage 11 and the reproduction port 9*e* of the valve plate 9. The reproduction oil passage 20 is continuously configured by connecting a plurality of oil passage holes 21 to each other. The oil passage holes 21 are formed by molding the port block 2 by casting and then performing hole processing. In the reproduction oil passage 20, a first turn-back oil passage portion 22 is configured by providing eight oil passage holes 21 in a portion on the outer peripheral side of the valve plate 9 in a first region X on the side of the high pressure port 9*a* of the virtual plane α. Furthermore, a second turn-back oil passage portion 23 is configured by providing three oil passage holes 21 in a portion that is on the outer peripheral side of the valve plate 9 and surrounded by the suction oil passage 10 and the discharge oil passage 11 in a second region Y on the side of the low pressure port 9*b* of the virtual plane α. One oil passage hole 21 connects the first turn-back oil passage portion 22 and the second turn-back oil passage portion 23 to each other. Three oil passage holes 21 connects the second turn-back oil passage portion and the reproduction port 9*e* to each other.

More specifically, as illustrated in FIGS. 8 to 13, the first turn-back oil passage portion 22 (FIG. 13) includes a first oil passage hole 21*a*, a second oil passage hole 21*b*, a third oil passage hole 21*c*, a fourth oil passage hole 21*d*, a fifth oil passage hole 21*e*, a sixth oil passage hole 21*f*, a seventh oil passage hole 21*g*, and an eighth oil passage hole 21*h*, which extend linearly and have the same inner diameter.

Figure 10:
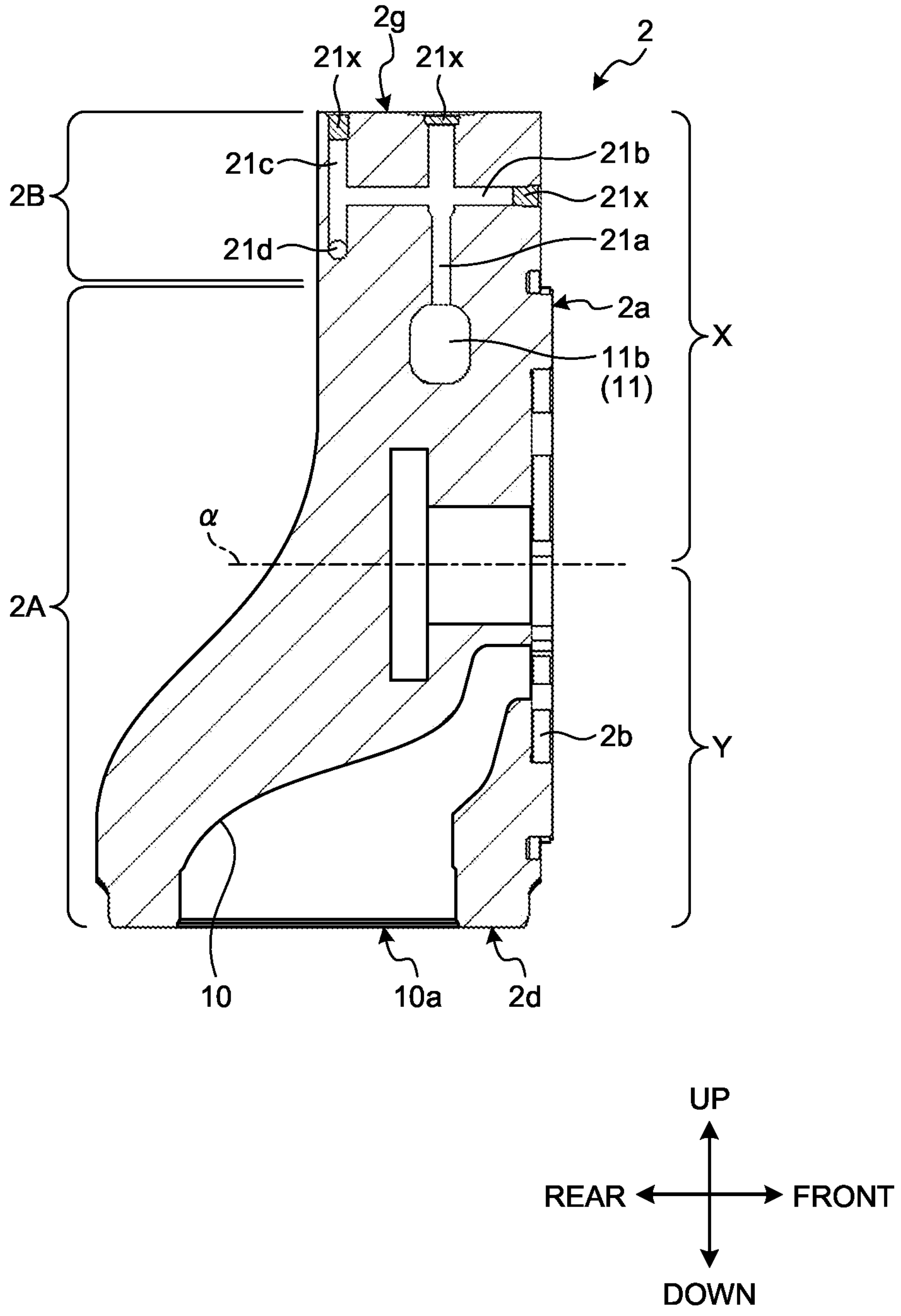
FIG. 10 is a cross-sectional view taken along line III-III in FIG. 4.

As illustrated in FIG. 10, the first oil passage hole 21*a* is formed downward from an upper surface 2*g* of the sub-block portion 2B, and communicates with the main oil passage portion 11*b* of the discharge oil passage 11. The second oil passage hole 21*b* is formed rearward from the front surface 2*a* of the sub-block portion 2B, and communicates with the first oil passage hole 21*a*. The second oil passage hole 21*b* extends through the first oil passage hole 21*a*, and the extending end of the second oil passage hole 21*b* is closed inside the sub-block portion 2B. The third oil passage hole 21*c* is formed downward from a portion behind the first oil passage hole 21*a* on the upper surface 2*g* of the sub-block portion 2B, and communicates with the second oil passage hole 21*b*. The third oil passage hole 21*c* extends through the second oil passage hole 21*b*, and the extending end of the third oil passage hole 21*c* is closed inside the sub-block portion 2B. The fourth oil passage hole 21*d* is formed rightward from a portion below the second oil passage hole 21*b* on a left side surface 2*h* of the sub-block portion 2B, and communicates with the third oil passage hole 21*c*. As illustrated in FIGS. 8 and 10, the fourth oil passage hole 21*d* extends through the third oil passage hole 21*c*, and the extending end of the fourth oil passage hole 21*d* is closed inside the sub-block portion 2B. The fifth oil passage hole 21*e* is formed downward from a portion on the right of the third oil passage hole 21*c* on the upper surface 2*g* of the sub-block portion 2B, and communicates with the fourth oil passage hole 21*d*. The fifth oil passage hole 21*e* is closed inside the sub-block portion 2B at a portion of communication with the fourth oil passage hole 21*d*. The sixth oil passage hole 21*f* is formed leftward from a portion above the second oil passage hole 21*b* on a right side surface 2*j* of the sub-block portion 2B, and communicates with the fifth oil passage hole 21*e*. The sixth oil passage hole 21*f* is closed inside the sub-block portion 2B at a portion of communication with the fifth oil passage hole 21*e*. The seventh oil passage hole 21*g* is formed downward from a portion on the right of the fifth oil passage hole 21*e* on the upper surface 2*g* of the sub-block portion 2B, and communicates with the sixth oil passage hole 21*f*. The seventh oil passage hole 21*g* extends through the sixth oil passage hole 21*f*, and the extending end of the seventh oil passage hole 21*g* is closed inside the main block portion 2A. The eighth oil passage hole 21*h* is formed rightward from a portion above the discharge oil passage 11 on a left side surface 2*e* of the main block portion 2A, and communicates with the extending end of the seventh oil passage hole 21*g*. The eighth oil passage hole 21*h* is closed inside the main block portion 2A at a portion of communication with the seventh oil passage hole 21*g*. Opening ends of the first oil passage hole 21*a*, the second oil passage hole 21*b*, the third oil passage hole 21*c*, the fourth oil passage hole 21*d*, the fifth oil passage hole 21*e*, the sixth oil passage hole 21*f*, the seventh oil passage hole 21*g*, and the eighth oil passage hole 21*h* are closed by providing a plug member 21*x* in each of the opening ends.

Figure 11:
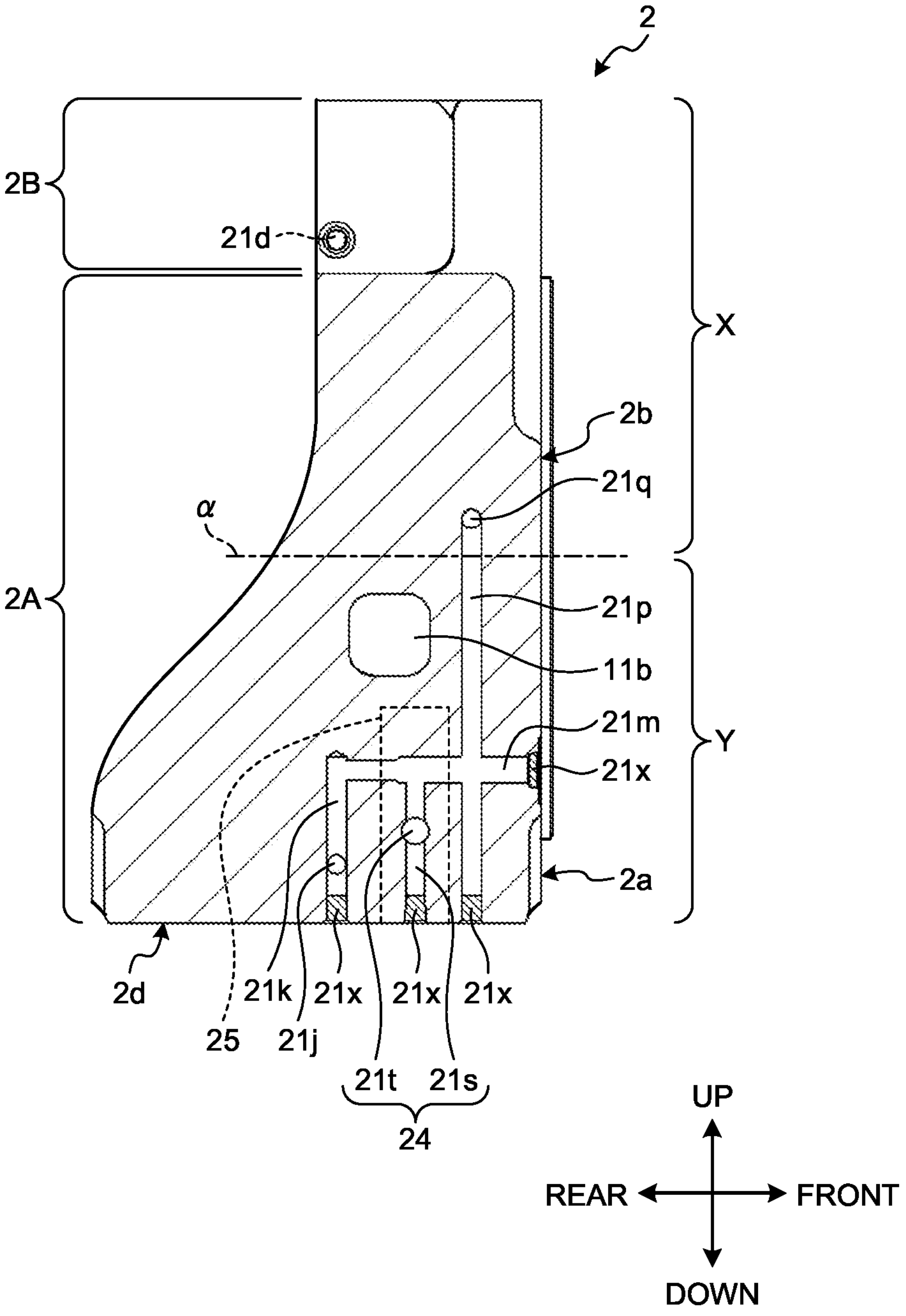
FIG. 11 is a cross-sectional view taken along line IV-IV in FIG. 4.

As illustrated in FIGS. 8, 11, and 12, the second turn-back oil passage portion 23 includes a ninth oil passage hole 21*j*, a 10th oil passage hole 21*k*, and an 11th oil passage hole 21*m*, which extend linearly and have the same inner diameter as the first oil passage hole 21*a*.

The ninth oil passage hole 21*j* is formed rightward from a portion below the discharge oil passage 11 on the left side surface 2*e* of the main block portion 2A. The extending end of the ninth oil passage hole 21*j* is closed inside the main block portion 2A. The 10th oil passage hole 21*k* is formed upward from the lower surface 2*d* of the main block portion 2A, and communicates with the ninth oil passage hole 21*j*. The 10th oil passage hole 21*k* extends through the ninth oil passage hole 21*j*, and the extending end of the 10th oil passage hole 21*k* is closed inside the main block portion 2A. The 11th oil passage hole 21*m* is formed rearward from a portion above the ninth oil passage hole 21*j* on the front surface 2*a* of the main block portion 2A, and communicates with the 10th oil passage hole 21*k*. The 11th oil passage hole 21*m* is closed inside the main block portion 2A at a portion of communication with the 10th oil passage hole 21*k*. Opening ends of the ninth oil passage hole 21*j*, the 10th oil passage hole 21*k*, and the 11th oil passage hole 21*m* are closed by providing the plug member 21*x* at each of the opening ends.

Figure 9:
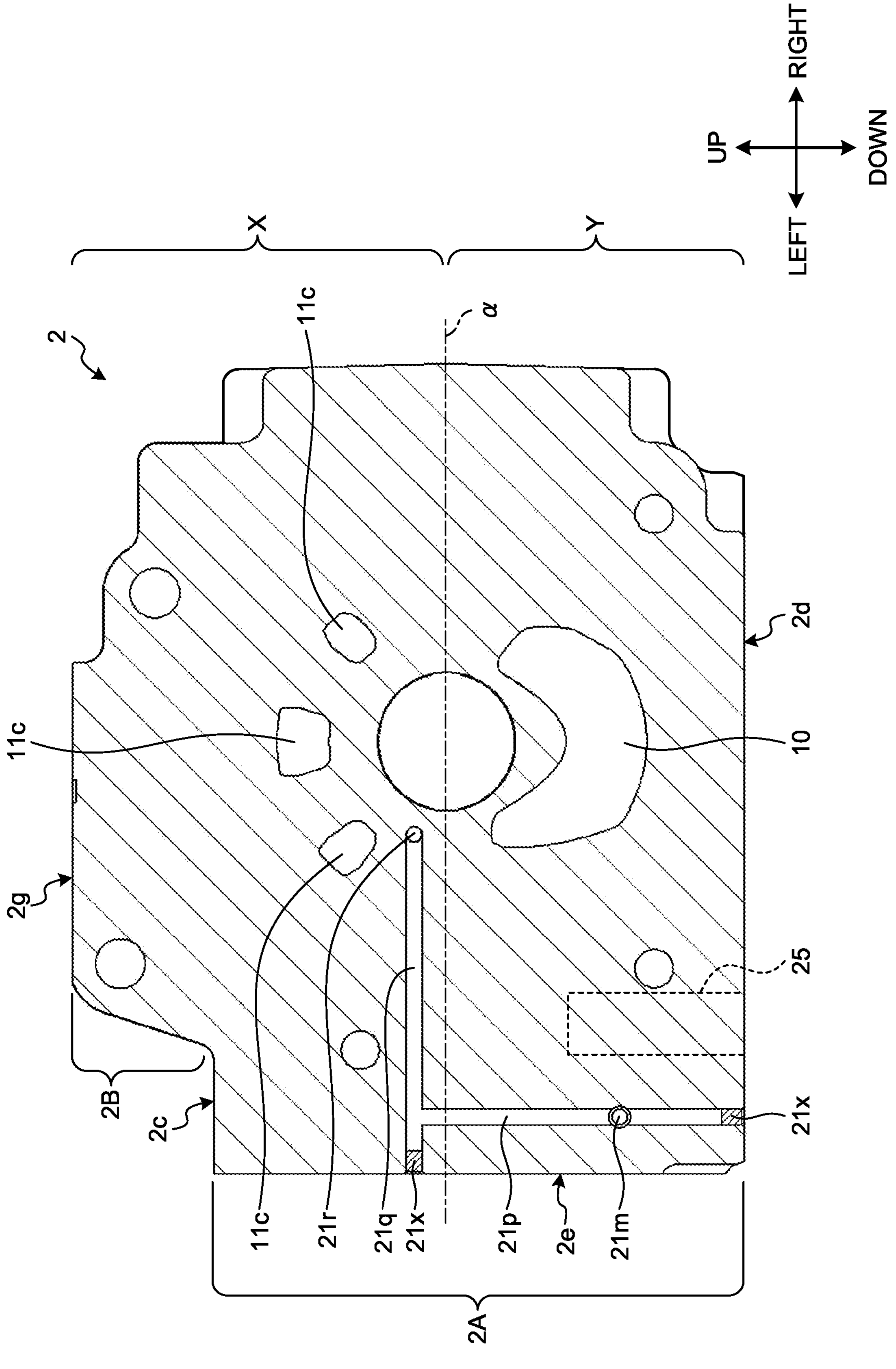
FIG. 9 is a cross-sectional view taken along line II-II in FIG. 5.

As illustrated in FIGS. 8, 9, and 11, the first turn-back oil passage portion 22 and the second turn-back oil passage portion 23 described above are connected to each other by a 12th oil passage hole 21*n*. The second turn-back oil passage portion 23 and the reproduction port 9*e* are connected to each other by a 13th oil passage hole 21*p*, a 14th oil passage hole 21*q*, and a 15th oil passage hole 21*r*. Each of the 12th oil passage hole 21*n*, the 13th oil passage hole 21*p*, the 14th oil passage hole 21*q*, and the 15th oil passage hole 21*r* extends linearly, and has the same inner diameter as the first oil passage hole 21*a*.

As illustrated in FIG. 8, the 12th oil passage hole 21*n* is formed upward from the lower surface 2*d* of the main block portion 2A, communicates with the extending end of a ninth oil passage forming hole, extends upward through the ninth oil passage forming hole. The extending end of the 12th oil passage hole 21*n* communicates with the eighth oil passage hole 21*h*. The 12th oil passage hole 21*n* is closed inside the main block portion 2A at a portion of communication with the eighth oil passage hole 21*h*. As illustrated in FIGS. 9 and 11, the 13th oil passage hole 21*p* is formed upward from a portion in front of the ninth oil passage hole 21*j* on the lower surface 2*d* of the main block portion 2A, and communicates with the 11th oil passage hole 21*m*. The 13th oil passage hole 21*p* extends through the 11th oil passage hole 21*m*. The extending end of the 13th oil passage hole 21*p* is closed inside the main block portion 2A at a position where the extending end has substantially the same height as the reproduction port 9*e* of the valve plate 9. The 14th oil passage hole 21*q* is formed rightward from the left side surface 2*e* of the main block portion 2A, and communicates with the extending end of the 13th oil passage hole 21*p*. As illustrated in FIGS. 3, 4, and 9, the 14th oil passage hole 21*q* extends through the 13th oil passage hole 21*p*. The extending end of the 14th oil passage hole 21*q* is closed inside the main block portion 2A at a position of an extension of the reproduction port 9*e* of the valve plate 9. The 15th oil passage hole 21*r* is formed rearward from a portion facing the reproduction port 9*e* of the valve plate 9 on the front surface 2*a* of the main block portion 2A, and communicates with the extending end of the 14th oil passage hole 21*q*. The 15th oil passage hole 21*r* is closed inside the main block portion 2A at a portion of communication with the 14th oil passage hole 21*q*. Opening ends of the 12th oil passage hole 21*n*, the 13th oil passage hole 21*p*, and the 14th oil passage hole 21*q* are closed by providing the plug member 21*x* at each of the opening ends. The opening end of the 15th oil passage hole 21*r* is connected to the reproduction port 9*e* when the valve plate 9 is attached to the front surface 2*a* of the port block 2.

The first turn-back oil passage portion 22 and the second turn-back oil passage portion 23 described above have a path length in which the total length of the 12th oil passage hole 21*n*, the 13th oil passage hole 21*p*, the 14th oil passage hole 21*q*, and the 15th oil passage hole 21*r* corresponds to ¼ of a wavelength determined by a rotational frequency of a hydraulic pump motor. The 12th oil passage hole 21*n* communicates between the first turn-back oil passage portion 22 and the second turn-back oil passage portion 23. The 13th oil passage hole 21*p*, the 14th oil passage hole 21*q*, and the 15th oil passage hole 21*r* communicate between the second turn-back oil passage portion 23 and the reproduction port 9*e*. Specifically, when a discharge amount is approximately 95 to 240 cc/rev and a normal rotation speed is set to 2,000 rpm, the first turn-back oil passage portion 22 and the second turn-back oil passage portion 23 have a path length of approximately 800 mm. Here, the port block 2 has an outer diameter dimension of a right to left width of approximately 340 mm, a height of approximately 280 mm, and a front to rear depth of approximately 150 mm. A path length (total≈600 mm) of the 12th oil passage hole 21*n* of approximately 180 mm (effective length as oil passage), the eighth oil passage hole 21*h* of approximately 120 mm, the 14th oil passage hole 21*q* of approximately 115 mm, the 13th oil passage hole 21*p* of approximately 80 mm, the seventh oil passage hole 21*g* of approximately 56 mm, and the 11th oil passage hole 21*m* of approximately 45 mm can be secured for the port block 2. A path length of 800 mm can be sufficiently secured by the remaining nine oil passage holes 21.

Moreover, as illustrated in FIGS. 11 to 13, the reproduction oil passage 20 is provided with an accumulator (pressure accumulating hole) 25 that mutually communicates with the reproduction oil passage 20 through a communication oil passage 24. The accumulator 25 is configured by forming a processed hole toward the right side of the 13th oil passage hole 21*p* and the upper side from a portion between the 10th oil passage hole 21*k* and the 13th oil passage hole 21*p* on the lower surface 2*d* of the main block portion 2A. The accumulator 25 has an inner diameter larger than those of the oil passage holes 21, has an extending end closed inside the main block portion 2A, and has an opening end closed by the plug member 21*x*. The communication oil passage 24 includes a 16th oil passage hole 21*s* and a 17th oil passage hole 21*t*. The 16th oil passage hole 21*s* is formed upward from a portion between the 10th oil passage hole 21*k* and the 13th oil passage hole 21*p* on the lower surface 2*d* of the main block portion 2A, and communicates with the 11th oil passage hole 21*m*. The 16th oil passage hole 21*s* is closed inside the main block portion 2A at a portion of communication with the 11th oil passage hole 21*m*. The 17th oil passage hole 21*t* is formed rearward from a portion below the 11th oil passage hole 21*m* on the left side surface 2*e* of the main block portion 2A, and communicates with the 16th oil passage hole 21*s*. The 17th oil passage hole 21*t* extends through the 16th oil passage hole 21*s*, and the extending end of the 17th oil passage hole 21*t* communicates with the accumulator 25. Opening ends of the 16th oil passage hole 21*s* and the 17th oil passage hole 21*t* are closed by providing the plug member 21*x* at each of the opening ends.

Figure 5:
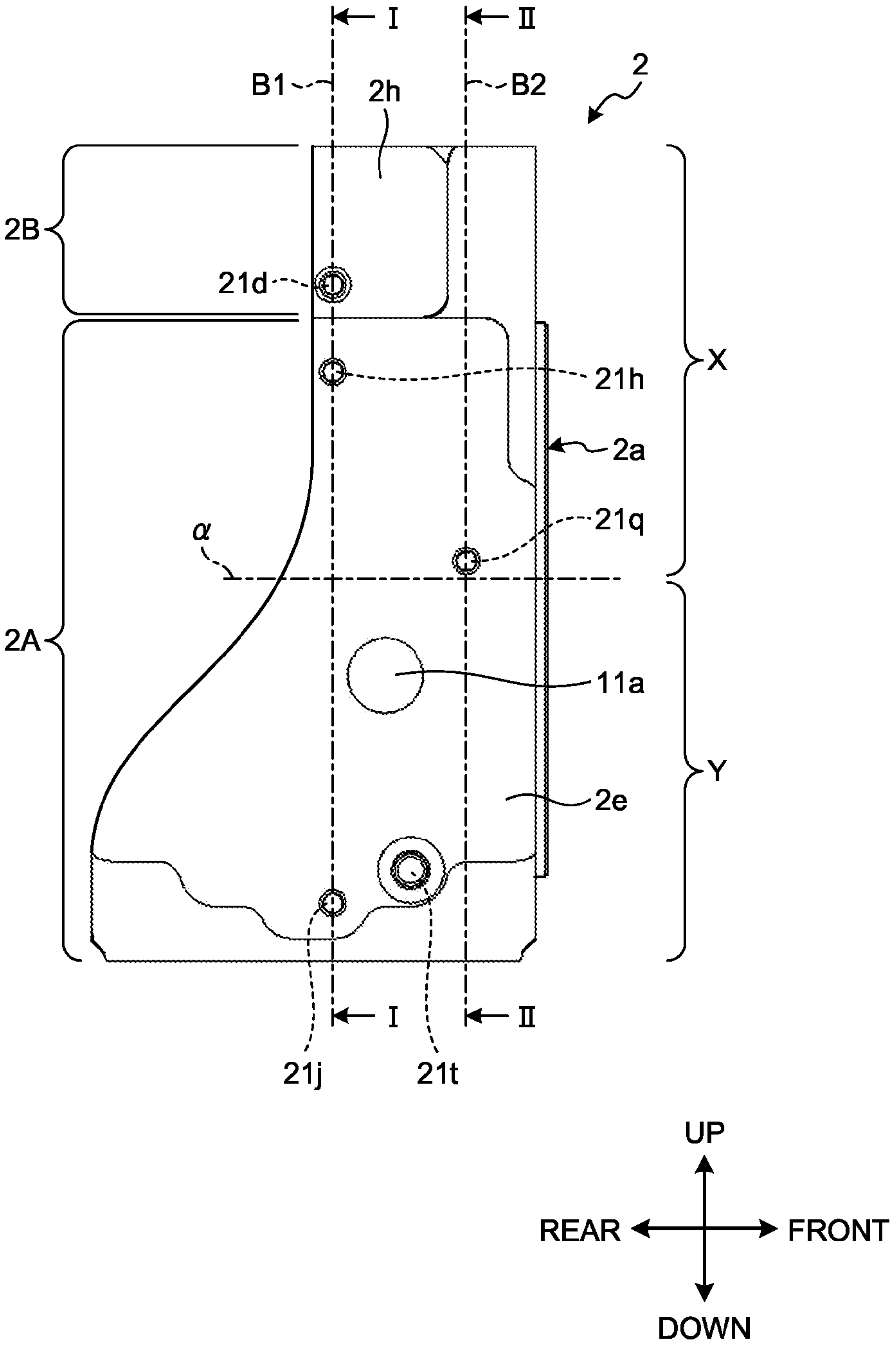
FIG. 5 is a left side surface view of the port block applied to the hydraulic pump motor in FIG. 1.
Figure 6:
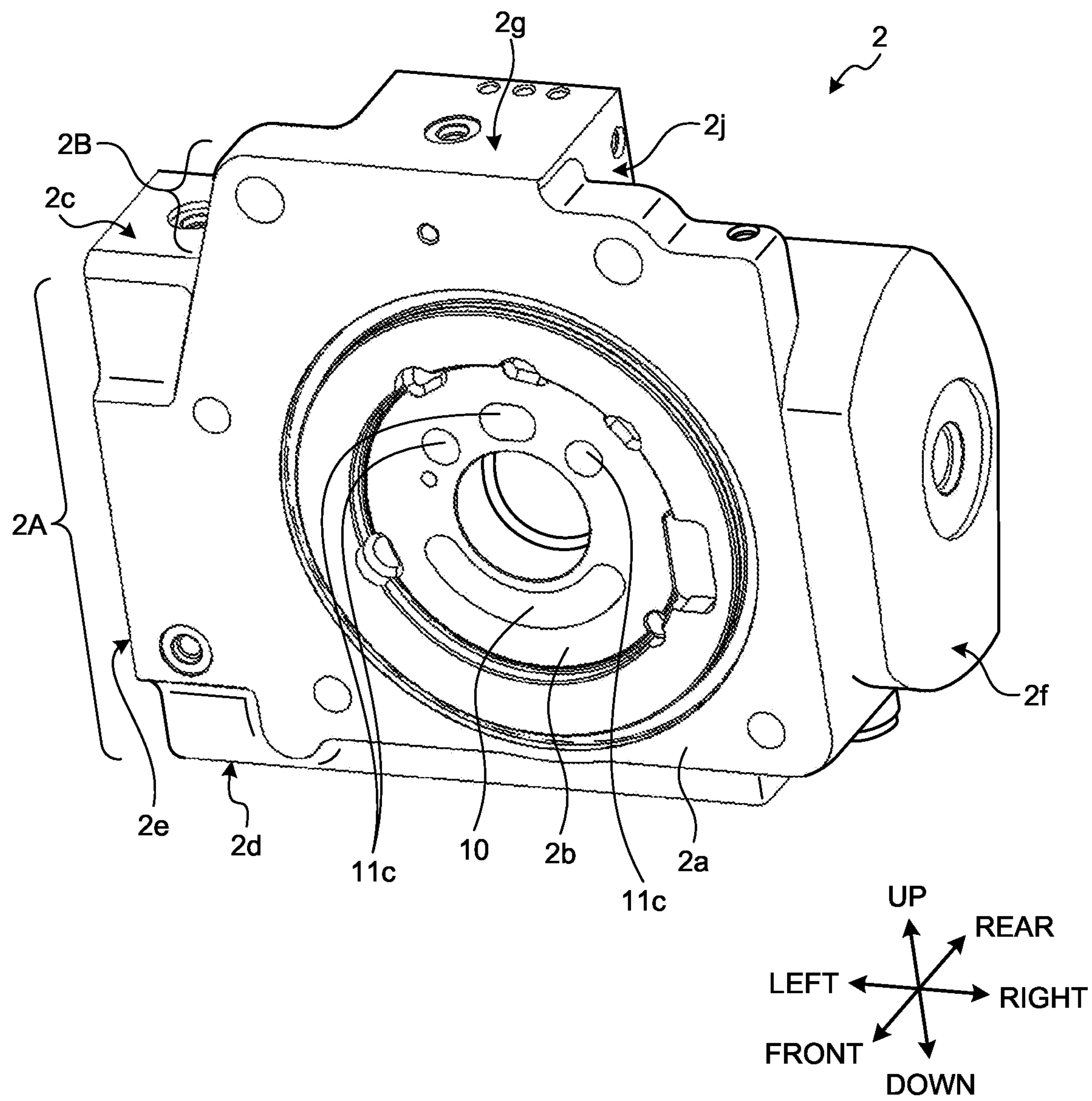
FIG. 6 is a perspective view of the port block applied to the hydraulic pump motor in FIG. 1.
Figure 7:
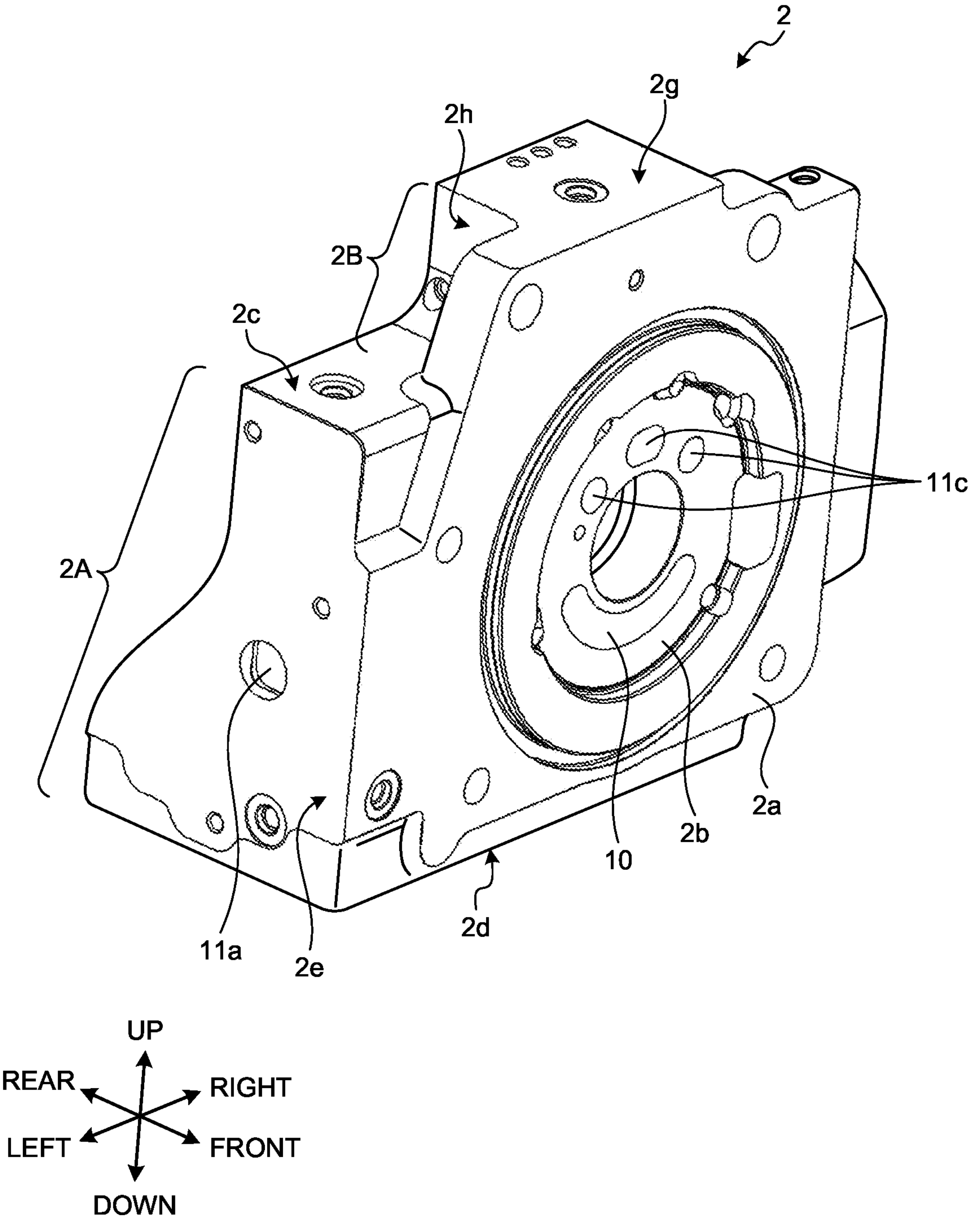
FIG. 7 is a perspective view of the port block applied to the hydraulic pump motor in FIG. 1.

As is clear from FIGS. 5, 8, and 9, in the present embodiment, the third oil passage hole 21*c*, the fourth oil passage hole 21*d*, the fifth oil passage hole 21*e*, the sixth oil passage hole 21*f*, the seventh oil passage hole 21*g*, the eighth oil passage hole 21*h*, the ninth oil passage hole 21*j*, the 11th oil passage hole 21*m*, and the 12th oil passage hole 21*n* are located on the same first processing reference plane B1 parallel to the front surface 2*a*. The 13th oil passage hole 21*p* and the 14th oil passage hole 21*q* are located on the same second processing reference plane B2 parallel to the front surface 2*a*. Furthermore, as illustrated in FIGS. 4 and 11, the 10th oil passage hole 21*k*, the 11th oil passage hole 21*m*, the 13th oil passage hole 21*p*, and the 16th oil passage hole 21*s* are located on the same third processing reference plane B3 parallel to the left side surface 2*e*.

In the hydraulic pump motor configured as described above, the pistons disposed in the respective cylinder bores reciprocate with the rotation of the cylinder block, and for example, oil in an oil tank connected to the suction oil passage 10 is supplied from the discharge oil passage 11 to a desired hydraulic device. During this time, the hydraulic pump motor transmits pressure of the high pressure port 9*a* from the reproduction oil passage 20 to the cylinder bore 4*a* before connecting the high pressure port 9*a* via the reproduction port 9*e*. This causes the cylinder bore 4*a* to communicate with the high pressure port 9*a* after pressure of the cylinder bore 4*a* rises to the pressure level equivalent to that of the high pressure port 9*a*, and prevents oil of the high pressure port 9*a* from flowing into the cylinder bore 4*a*. As a result, occurrence of pressure pulsation due to sudden pressure fluctuation is prevented, and the risk of vibration and noise is eliminated. In addition, since the reproduction oil passage 20 is configured by providing the plurality of oil passage holes 21 inside the port block 2, additional components such as a hose and a tube are unnecessary. Moreover, since the reproduction oil passage 20 is provided between the discharge oil passage 11 and the reproduction port 9*e* from the first region X on the side of the high pressure port 9*a* set in the port block 2 via the second region Y on the side of the low pressure port 9*b*, a long reproduction oil passage 20 can be secured inside the port block 2 while inhibiting an increase in the external dimension of the port block 2.

Note that, although a hydraulic pump motor including a cylinder block having nine cylinder bores is described in the above-described embodiment, the number of cylinder bores is not limited thereto. Furthermore, although a hydraulic pump motor in which a swash plate reciprocates a piston is described, the present disclosure can also be applied to that of inclined shaft type. Moreover, the hydraulic pump motor may be on the variable capacity configured so as to change an oil flowing amount by changing the inclination angles of the swash plate and an axle.

Furthermore, although the reproduction oil passage is provided only in the port block in the above-described embodiment, the reproduction oil passage may be provided so as to pass through a case, for example. Note that, although a reproduction oil passage including a turn-back oil passage portion is described, the reproduction oil passage is not necessarily required to include the turn-back oil passage portion. Although, when a reproduction oil passage is configured to include a turn-back oil passage portion, turn-back oil passage portions are provided at two locations of the reproduction oil passage in the above-described embodiment, the number of the turn-back oil passage portions is not limited to that in the embodiment. Moreover, the first turn-back oil passage portion including eight oil passage holes and the second turn-back oil passage portion including three oil passage holes are described, the number of oil passage holes constituting the turn-back oil passage portions is not limited to that in the embodiment.

REFERENCE SIGNS LIST

2 PORT BLOCK
2*d* LOWER SURFACE
2*e* LEFT SIDE SURFACE
4 CYLINDER BLOCK
4*a* CYLINDER BORE
6 PISTON
9 VALVE PLATE
9*a* HIGH PRESSURE PORT
9*b* LOW PRESSURE PORT
9*e* REPRODUCTION PORT
10 SUCTION OIL PASSAGE
10*a* SUCTION PORT
11 DISCHARGE OIL PASSAGE
11*a* DISCHARGE PORT
20 REPRODUCTION OIL PASSAGE
21 OIL PASSAGE HOLE
22 FIRST TURN-BACK OIL PASSAGE PORTION
23 SECOND TURN-BACK OIL PASSAGE PORTION
25 ACCUMULATOR
C SHAFT CENTER
X FIRST REGION
Y SECOND REGION
a VIRTUAL PLANE

The invention claimed is:

1. A hydraulic pump motor, comprising:

a cylinder block provided with a plurality of cylinder bores around a rotation axis; and a port block on which an end surface of the cylinder block is rotatably and slidably in contact with the cylinder block via a valve plate, the valve plate being provided with a high pressure port on one side of a virtual plane including the rotation axis and provided with a low pressure port on another side of the virtual plane on a circumference centered on a rotation axis of the cylinder block, the port block being provided with a discharge oil passage that communicates with the high pressure port and a suction oil passage that communicates with the low pressure port, and a piston disposed in each cylinder bore reciprocating with rotation of the cylinder block, oil flowing through the discharge oil passage and the suction oil passage, wherein the valve plate is provided with a reproduction port at a bottom dead center side position that communicates with one of the plurality of cylinder bores between the low pressure port and the high pressure port, the port block is internally provided with a reproduction oil passage that communicates directly between the reproduction port and the discharge oil passage, and the reproduction oil passage passes through a first region on a side of the high pressure port of the virtual plane and passes through a second region on a side of the low pressure port of the virtual plane in the port block from the discharge oil passage to the reproduction port.

2. The hydraulic pump motor according to claim 1, wherein a discharge port of the discharge oil passage opens at a first side surface that is located around the rotation axis on an outer surface of the port block, a suction port of the suction oil passage opens at a second side surface that is located around the rotation axis on the outer surface of the port block and that is adjacent to the first side surface, and the second region is provided in a portion surrounded by the discharge oil passage and the suction oil passage.

3. The hydraulic pump motor according to claim 1, wherein continuous turn-back oil passage portions configured by connecting a plurality of linearly extending oil passage holes to each other are provided in at least one of the first region and the second region.

4. The hydraulic pump motor according to claim 1, wherein a pressure accumulating hole that communicates with the reproduction oil passage is provided in at least one of the first region and the second region.

* * * * *